No. 848,798. PATENTED APR. 2, 1907.
J. H. ANGLE.
FOCUSING CLOTH.
APPLICATION FILED DEC. 12, 1906.
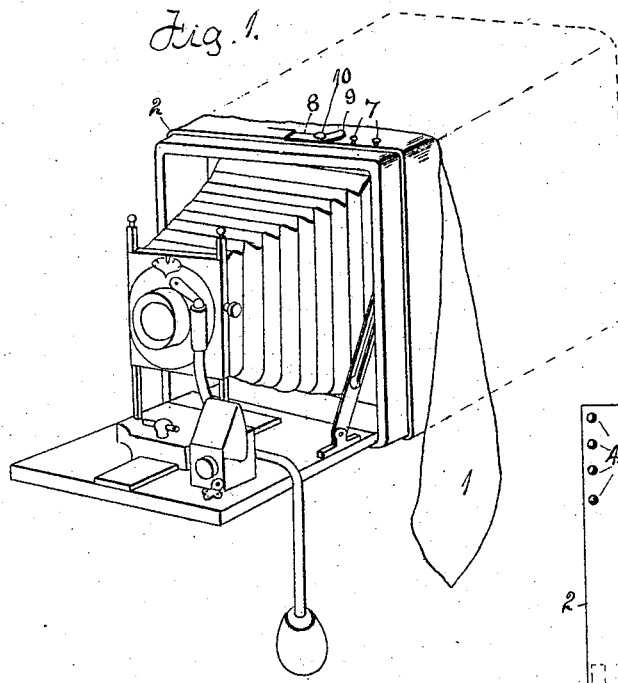
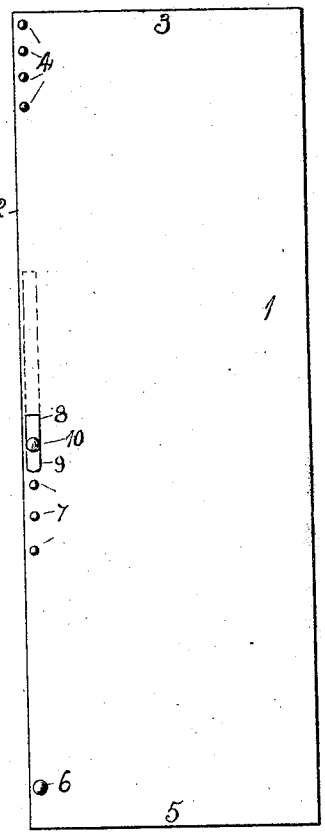
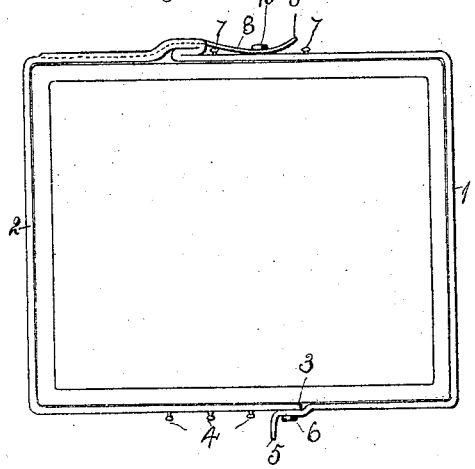
Witnesses:
E. Behel.
J. S. Clark.
Inventor:
Jackson H. Angle.
By A. O. Behel
Atty.
THE NORRIS PETERS CO., WASHINGTON, D. C.

UNITED STATES PATENT OFFICE.

JACKSON H. ANGLE, OF FREEPORT, ILLINOIS.

FOCUSING-CLOTH.

No. 848,798.     Specification of Letters Patent.     Patented April 2, 1907.

Application filed December 12, 1906. Serial No. 347,547.

*To all whom it may concern:*

Be it known that I, JACKSON H. ANGLE, a citizen of the United States, residing at Freeport, in the county of Stephenson and State of Illinois, have invented certain new and useful Improvements in Focusing-Cloths, of which the following is a specification.

The object of this invention is to construct a focusing-cloth to be used in connection with cameras, made adjustable to fit various-sized cameras and provided with means for holding it in connection with the camera.

In the accompanying drawings, Figure 1 is a perspective view of a camera having my improved focusing-cloth connected therewith. Fig. 2 is a face view of a camera with my focusing-cloth connected thereto. Fig. 3 is an outstretched view of the cloth.

The camera is shown for the sole purpose of illustrating the application of my improved focusing-cloth.

The focusing-cloth 1 is of material suitable for the purpose and is of a length to inclose the face. Along one end 2 of the cloth, near the edge 3, are secured a series of ball portions 4 of glove-fasteners, and near the junction of the end 2 and edge 5 is secured the snap portion 6 of a glove-fastener. Near the center of the end 2 are secured a series of ball portions 7 of glove-fasteners, and an elastic band 8 is located in the hem of the end and having one end secured to the cloth. The other end 9 of the elastic band has a snap portion 10 of a glove-fastener connected to it. In placing the cloth in connection with a camera it is placed around it and the snap portion 6 placed over one of the ball portions 4. The elastic band 8 is drawn out and the snap portion 10 placed over one of the ball portions 7, which may create a fold in the end 2 of the cloth, as shown at Fig. 2. The strain exerted by the elastic band on the cloth will be sufficient to hold the cloth in connection with the camera. The series of ball portions 4 permits the adjustment of the cloth to different-sized cameras, and the series of ball portions 7, in connection with the elastic band, admits of taking up any slack in the cloth. The cloth can be folded over the edge of the camera while a plate is being placed in position. This construction of cloth will require much less material than the ordinary focusing-cloth, thereby reducing the expense nearly one-half.

I claim as my invention—

1. A focusing-cloth provided with means for connecting its edges, and yielding means intermediate its edges and located near one end for taking up slack.

2. A focusing-cloth provided with adjustable means for connecting its edges, and yielding means intermediate its edges and located near one end for taking up slack.

3. A focusing-cloth provided with means for connecting its edges and an elastic band located near one end having one end secured to the cloth and its other end provided with means for attachment to the cloth.

JACKSON H. ANGLE.

Witnesses:
   H. A. HARTMAN,
   W. B. ANGLE.